Dec. 17, 1968   B. H. GOLDBECK ET AL   3,416,852
FUNCTIONALLY COMBINED MICROSCOPE AND CARRYING CASE
Filed May 18, 1964   4 Sheets-Sheet 1
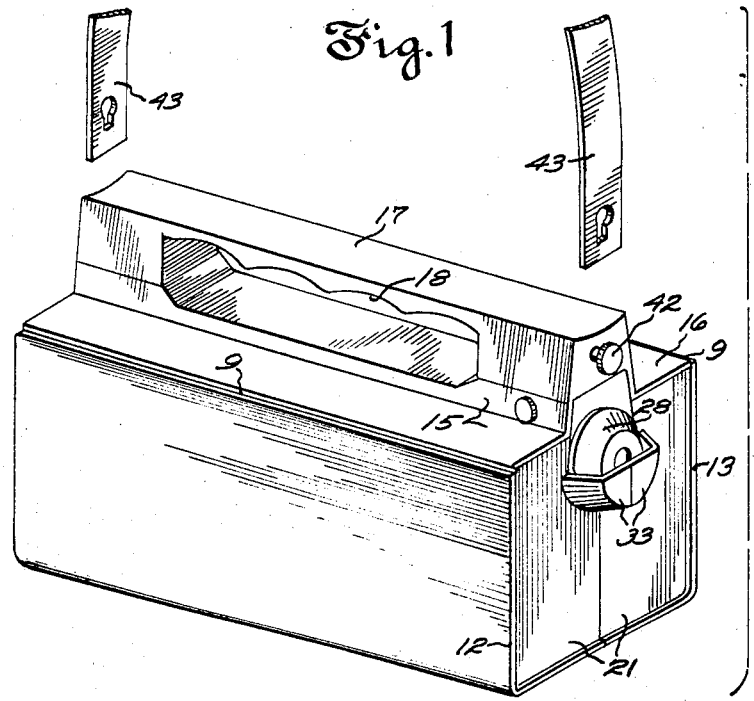
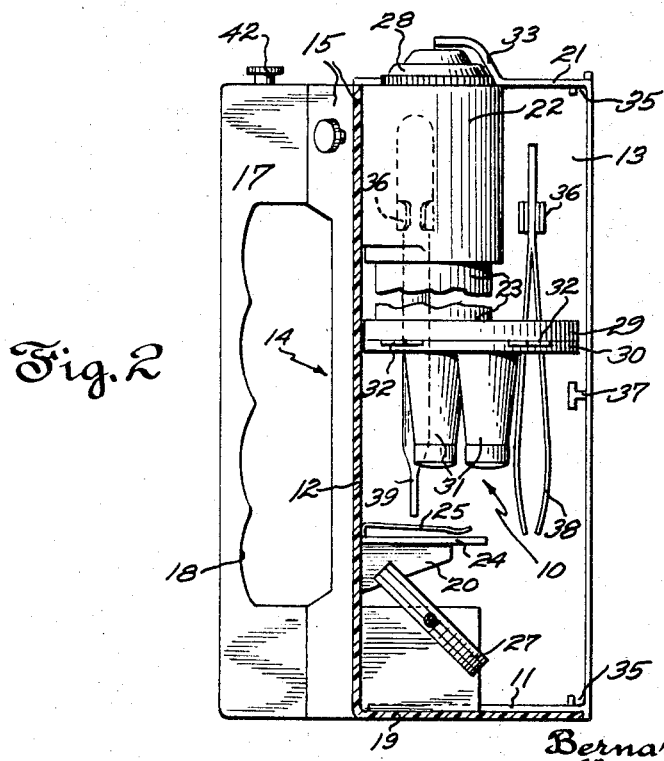
INVENTORS
Bernard H. Goldbeck
William L. Effinger, Jr.
BY
ATTORNEY Dec. 17, 1968  B. H. GOLDBECK ETAL  3,416,852
FUNCTIONALLY COMBINED MICROSCOPE AND CARRYING CASE
Filed May 18, 1964  4 Sheets-Sheet 2
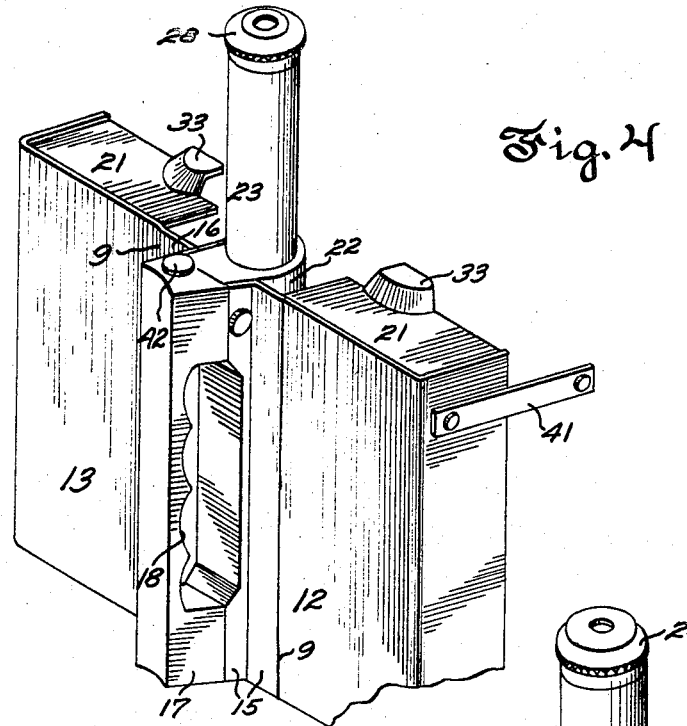
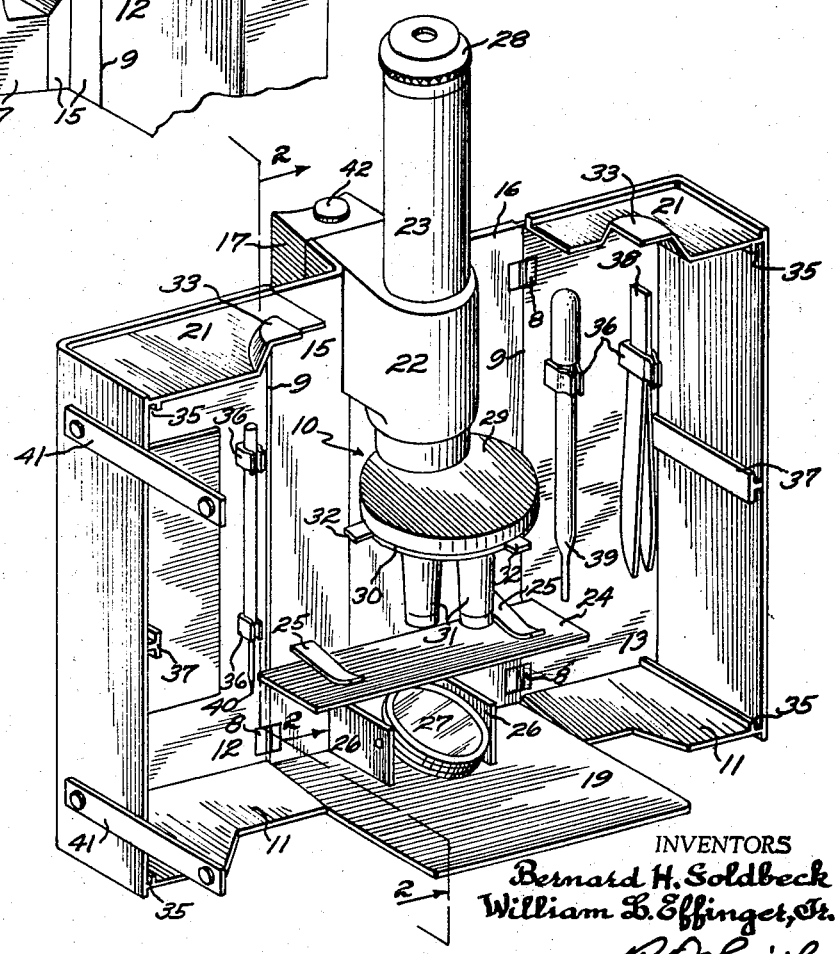
INVENTORS
Bernard H. Goldbeck
William L. Effinger, Jr.
BY R. L. Smith
ATTORNEY.

Dec. 17, 1968   B. H. GOLDBECK ET AL   3,416,852
FUNCTIONALLY COMBINED MICROSCOPE AND CARRYING CASE
Filed May 18, 1964                      4 Sheets-Sheet 3
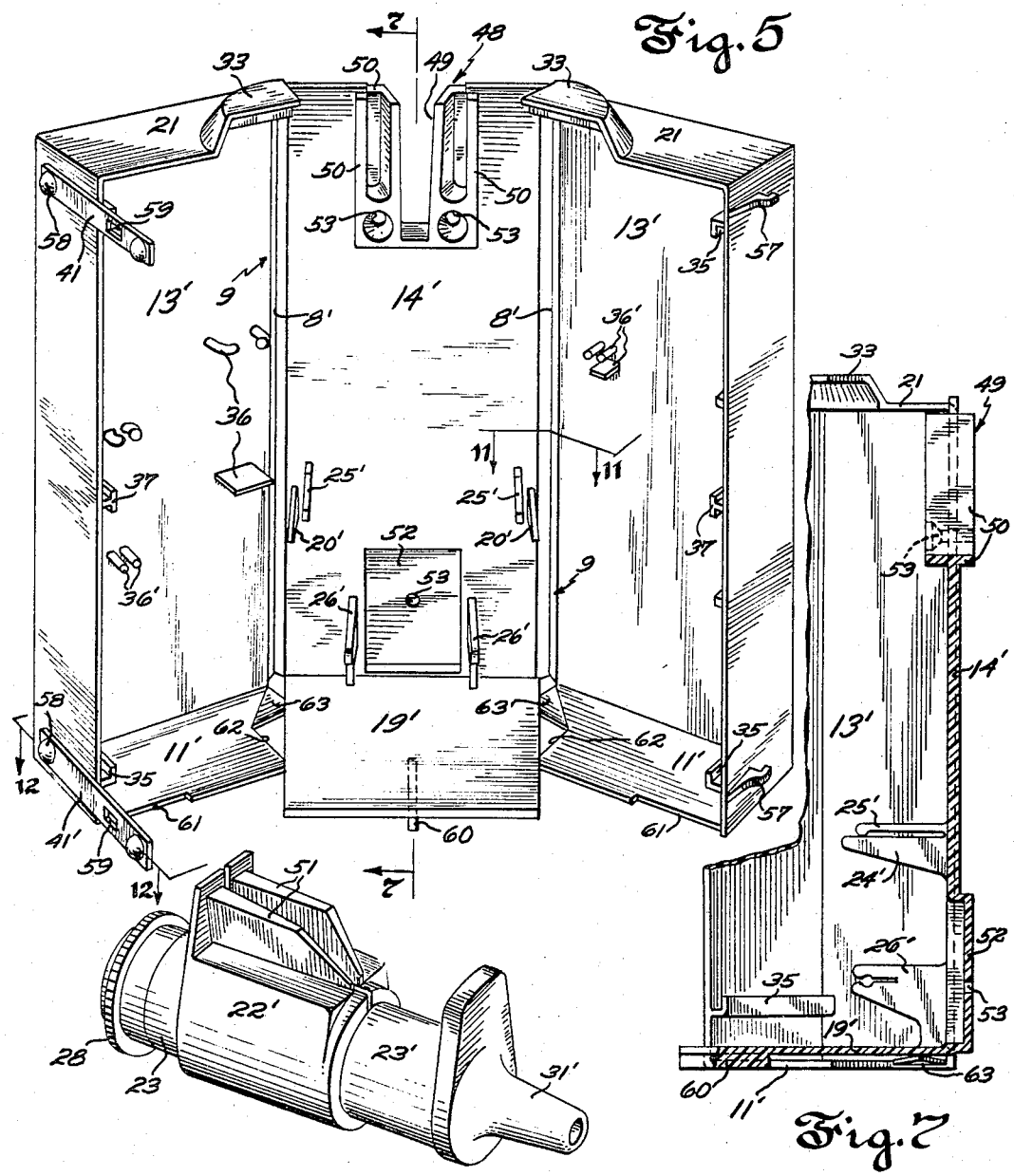
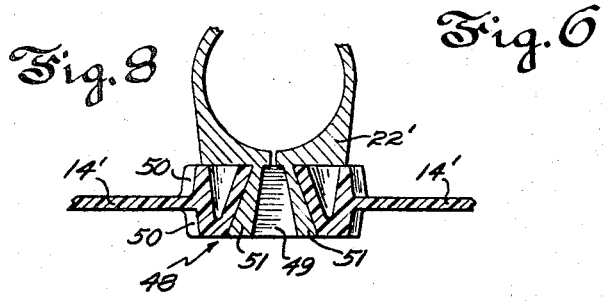
INVENTORS
Bernard H. Goldbeck
William L. Effinger, Jr.
BY
ATTORNEY.

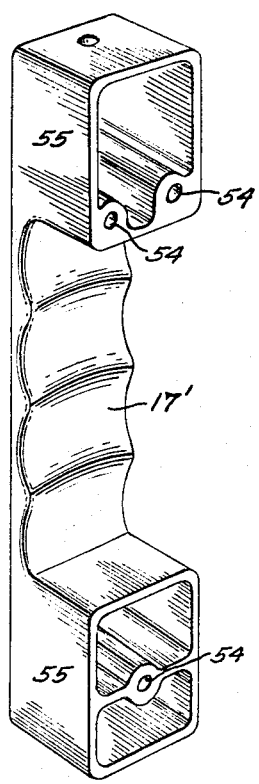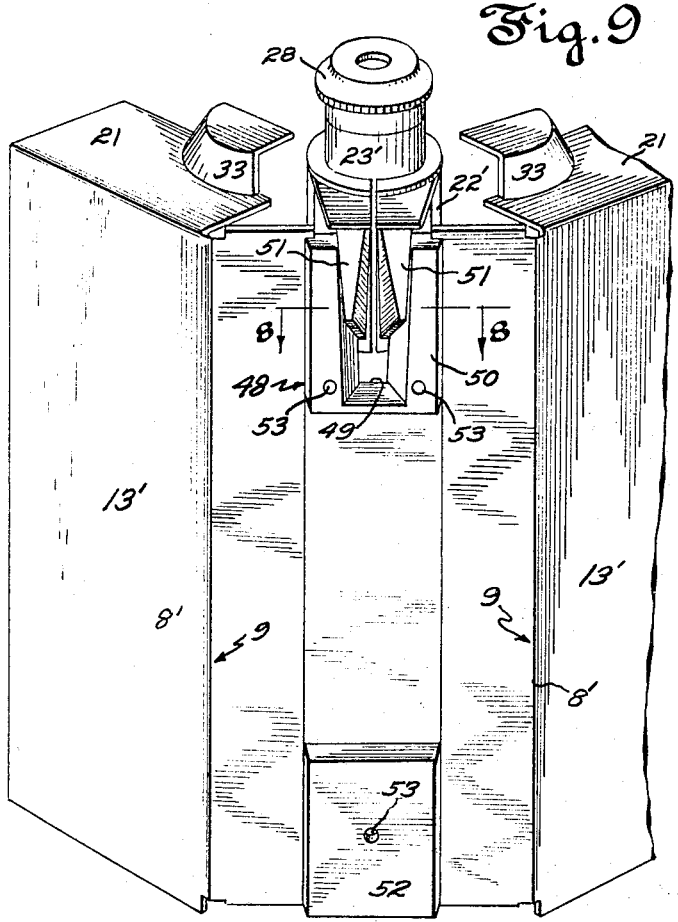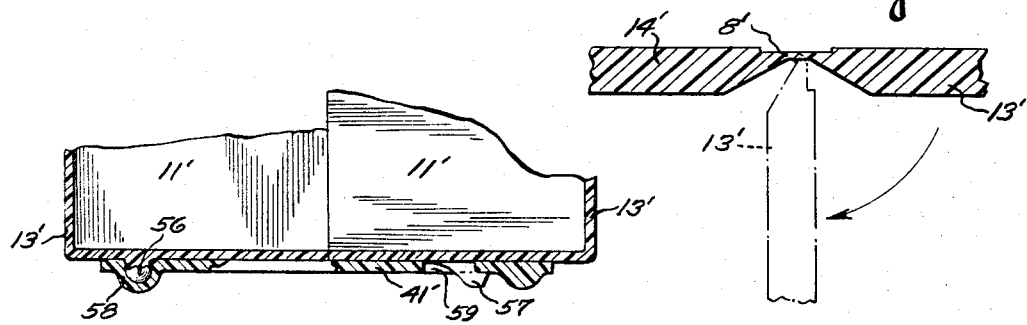

United States Patent Office

3,416,852
Patented Dec. 17, 1968

---

3,416,852
FUNCTIONALLY COMBINED MICROSCOPE AND CARRYING CASE
Bernard H. Goldbeck, West Haven, and William L. Effinger, Jr., Branford, Conn., assignors to The A. C. Gilbert Company, New Haven, Conn., a corporation of Maryland
Filed May 18, 1964, Ser. No. 368,244
11 Claims. (Cl. 350—82)

---

ABSTRACT OF THE DISCLOSURE

A functionally combined microscope and carrying case is provided wherein the case defines the supporting standard for the microscope, and includes a handle coupled to the standard and extending externally of the case for carrying and maneuvering the same.

---

This invention relates to a portable laboratory kit inclusive of a microscope functionally combined with a carrying case constructed to be converted into a stand that will support the microscope in conveniently usable position outdoors or anywhere in field work where there is apt to be no flat nor stable support surface on which a conventional microscope can conveniently stand.

An object of the invention is to provide a carrying case that incorporates a microscope contained in and protected by the case for transportation and storage and so constructed as to be supported stably by the case in conveniently usable position as a result of merely opening the case and turning it so as to stand on end.

Another object is also to equip the interior of such carrying case with easily accessible instruments that are adjuncts to the use of the microscope.

Another object is to make use of swingable side walls of the case to serve as steadying standards flanking the upright length of the microscope and spreadable to various relative angles like wings to suit the unevenness of any outdoor support surface such as a rock, stone wall or mound of earth.

Another object is to make use of an end wall of the carrying case to serve as a base whose area of support can be substantially broadened by the presence of the wing like side walls of the case when the latter are swung open.

A particular object is so to construct the carrying case that all of its component and relatively movable parts are incorporated in a single molded body of plastic material having sufficient resilient flexibility to permit relative movement of portions of the case for performing functions commonly requiring parts made of metal, or the assemblage of metallic parts with plastic parts. Such functions include releasable support, and the rendering accessible, of laboratory instruments or work material stored in the carrying case. Related benefits are to prevent surface corrosion such as metallic parts are subject to when used outdoors, and to save labor cost in quantity production of the case, with assurance of greater uniformity of dimensions and accuracy of work results derived from use of the case as the support standard of a microscope.

A further object is to provide a microscope at least some of whose viewing parts may without the use of tools be separated from the case for inspecting outdoor specimens in their habitat instead of removing the specimen from a spot to which it may be anchored and bringing it to the carrying case.

A still further object is to provide a carrying case that will house and protect the longish viewing tube of a microscope without requiring that the length of the carrying case be as long as the microscope when the viewing tube is extended.

These and other objects of the invention will appear in fuller particular from the following description of a preferred form of the invention having reference to the appended drawings wherein:

FIG. 1 is an outside view of a laboratory kit embodying the present improvements with its carrying case handle-equipped and closed.

FIG. 2 shows the carrying case of FIG. 1 standing on end and in section on the plane 2—2 in FIG. 3 looking in the direction of the arrows.

FIG. 3 shows the laboratory kit with the carrying case standing on end with its side walls swung open to afford stable base support for the contained microscope and accessory instruments.

FIG. 4 is a rear view of the carrying case standing open as in FIG. 3.

FIG. 5 is a perspective view of the interior of an opened carrying case that is the functional equivalent of that shown in FIG. 3 but of modified construction, being constituted as a single integral body of molded plastic.

FIG. 6 shows mounting parts of modified construction for attaching the eyepiece of the microscope removably to the carrying case.

FIG. 7 is a view taken in section on the plane 7—7 in FIG. 5 looking in the direction of the arrows.

FIG. 8 is a fragmentary view in section on the plane 8—8 in FIG. 9.

FIG. 9 is a perspective view of the rear of the case of FIG. 5 with the removable eyepiece mounted in place.

FIG. 10 is a perspective view of the carrying handle detached from the case of FIG. 9.

FIG. 11 shows enlarged and sectioned on the planes 11—11 in FIG. 5 the flexible web of a "live" hinge that joins the side walls to the rear wall of the case.

FIG. 12 is an enlarged detail of one of the "button-on" straps that holds the case closed, shown in section on the plane 12—12 in FIG. 5.

In the drawings the carrying case of the improved laboratory kit is shown to comprise side walls 12 and 13 that meet to be flush when closed as shown in FIG. 1 whereby to completely house and protect a contained microscope 10. The side walls 12 and 13 are hinged by conventional means 8 along the fold line 9 to outer edges of a back wall 14 which is formed in part by two L-shaped frame brackets 15, 16 secured rigidly on opposite sides respectively of a bar-like carrying handle 17 containing the elongate aperture 18 for insertion of the fingers of the operator's hand to grip the handle. The inner surface of handle 17 may border on the interior of the case.

The handle 17 is U-shaped and one of its ends projects into the interior of the case so as to afford a slide bearing 22 for the viewing tube 23 of the microscope. The main length of handle 17 occupies and fills the space between angle brackets 15 and 16 which are secured rigidly thereto and thus the handle forms in effect a strong "backbone" for handling the carrying case in either open and closed condition as well as forming a fixed portion of the microscope housing when the case is closed.

One end wall 19 of the case is shown in FIGS. 2 and 3 to serve as a base for the upstanding handle 17 which with its side brackets 15, 16 thus constitutes the standard of the microscope. Base wall 19 is overlapped by the bottom flaps 11 of the side walls 12 and 13 when the case is closed as shown in FIG. 2.

The other end wall of the case is formed by flaps 21 which are contoured to snugly fit and retain the eyepiece of the microscope when the case is closed as shown in FIGS. 1 and 2.

Other functional parts of the microscope may be of a construction and relationship disclosed in a copending application, Ser. No. 146,486, of common ownership with the present application, and need be but briefly referred to here. A stage 24 or a specimen bearing transparent or translucent plate taking the place thereof, may be removably clamped against the top edges of stage supports 20 (see FIG. 2) by spring clips 25, all fixed on and projecting forward from the upright surface of frame brackets 15, 16. Also secured to these parts 15 and 16 of the microscope standard, as well as to the bottom end wall 19 of the case, is a forked bracket 26 between whose forwardly projecting arms there is pivotally mounted the usual tiltable reflecting mirror 57 for illuminating thin, slide carried specimens resting on the stage supports 20.

The viewing tube 23 has a frictional sliding fit in the handle projection 22. The top end of the viewing tube is closed by an eyepiece 28 which becomes snugly nested in protecting bulges 33 of the end walls 21 when the case is closed. There is fixed on the bottom end of the tube a turret 29 equipped with a bottom face plate 30 that is rotatably adjustable relatively thereto. Plate 30 is equipped with three objective lenses (not shown) of differing magnifying power located respectively in the three downwardly directed nipples 31. By rotatively swiveling the plate 30 about its eccentric pivotal connection to turret 29 by means of its handle tabs 32, any one of the nipples 31 may be swung into axial coincidence with the viewing tube 23.

The interior surfaces of the casing walls are equipped with means such as clips 36, shelves 37 and grooves 35 in which can be removably lodged auxiliary instruments useful for conditioning specimens for inspection such as tweezers 38, a dropper syringe 39, a prod 40 and glass slides (not shown). The case can be fastened closed by snap-on bands 41 and an anchorage stud 42 is provided at each end of the handle 17 for quick attachment and detachment of a sling strap 43 by means of which the carrying case can be suspended from one's shoulder to leave the hands free.

Preferably a casing as now described can be made of molded plastic parts that are for the most part stiff enough to oppose deformity. In FIGS. 1 and 2 the viewing tube is shown to have been retracted slidingly into the case far enough to leave partly exposed outside of the closed walls of the case only a portion of the eyepiece 28. This would bring the turret and its lense containing nipples near the bottom of the case in FIG. 2 and hence the viewing tube in FIG. 2 is shown to be contracted in length.

In transporting or storing the combined microscope and carrying case described, the case can be locked closed by the snap-on fastening straps 41 and carried either by the handle 17 or by the sling strap 43. For use in the field the housing sections will be opened to selective angular extent to level the microscope on an uneven support surface when the casing is stood on end. Thus, when deployed to different angular extents, the housing sections contact different portions of a given uneven support surface, and by adjusting the angle, portions of the surface providing bevel footing may be selected. The viewing tube 23 can be pulled from inboard position to outboard position with respect to the interior of the case and use then made of the microscope for inspecting specimens in conventional manner as described in the aforesaid copending application, Ser. No. 146,486.

FIGS. 5 to 12, inclusive, illustrate a less costly construction of carrying case that is the functional equivalent of that shown in FIGS. 1–5, but wherein the slide bearing 22' for the viewing tube 23' of the microscope is constructed as best shown in FIG. 6 in order to be removable from the modified carrying case.

In FIGS. 5 to 12, the entire carrying case comprises a single body of suitable molded plastic such as polypropylene whose physical properties are such as will enable each side wall 13' of the case to be hinged to the back wall 14' solely by a thin and narrow web 8' of the said molded plastic as best shown in FIG. 11. This hinge web extends along the aforesaid hinge line 9 from top to bottom of the case and will flex an unlimited number of times from its full line (case open) position in FIG. 11 to its broken line (case closed) position. The full thickness of the casing walls 13' and 14' are notched as shown freely to permit the folding flexure of the hinge web. Such hinge web can be termed a "live" hinge because it can be molded in either a corner forming or a straightaway condition. When flexed, whether to open or to close, the web will tend resiliently to restore itself, and the casing parts which it joins, to the condition in which the web was molded.

Another feature of the integral one-piece plastic case is the provision at the top edge of its rear wall 14' of a wedging socket 48 formed by a dovetail-shaped and tapering cutout 49 in a pad-like thickened portion 50 of the rear wall and which opens upward to receive the slide bearing 22' for viewing tube 23'. When seated in socket 48 the slide bearing is retained firmly and removably therein as shown in FIGS. 8 and 9. Hence the slide bearing together with the viewing tube 23' can be removed from the carrying case without need for tools and taken away from the carrying case to magnify and inspect any specimen that is too large or otherwise unsuited to being inspected through the viewing tube while mounted in the carrying case. The slide-bearing 22' is split axially and receives the viewing tube with a springy friction fit. Its two mounting flanges 51 flare laterally outward at each side of the split in the manner of a dovetail fitting and both of these flanges converge in a downward direction in conformity with the sides of the cutout. Thus the slide bearing becomes firmly lodged in and is easily liftable from supporting engagement in its mounting socket 48.

The modified carrying case is formed to provide another external pad 52 at the lower edge of the rear wall 14 of the case. Both this pad and the pad 50 have blank holes 53 receptive to long, self threading screws that extend through registering holes 53 in the hollow, block-like ends 55 of the modified handle 17' shown in FIG. 10.

As integral portions of the molded plastic of the case the interior surfaces of its walls carry forwardly projecting fingers 25', 26', 36', which serve the purpose of metallic elements 25, 26 and 36 which are shown in FIG. 3 as separate parts attached to the plastic wall of the case and hence requiring assembling operations in the manufacture of the case. Because of the aforesaid resilient properties of the molded plastic of the case the integrally molded projections 25', 26' and 36' are enabled to spring apart somewhat, to receive and cling resiliently to accessory instruments of a telescope kit such as the parts numbered 24, 38, 39, 40 in FIG. 3 to be conveniently stored in the carrying case.

Also formed on the exterior surface of the front wall of the carrying case are a ball stud 56 and a projecting catch 57 on respectively opposite sides of the meeting edges of the spreadable front wall of the box. The fastening strap 41' shown in FIGS. 5 and 12 has a snap socket formation 58 near one end and a rectangular aperture 59 near the other end. The socket end of the strap will snap on and off the stud 56 and the aperture can be engaged with the catch 57 thus fastening the meeting edges of the front wall of the box closely together without gaps.

The botom end walls 11' and 19' of the one-piece casing are best shown in FIGS. 5 and 7 where it is seen that the former underlap the latter. End wall 19' is maintained horizontal slightly above the end walls 11' by a short support fin 60 accommodated by the notches 61 in the meeting edges of the bottom walls 11' when the latter are closed. Each of the bottom walls 11' has a cut-away 62 at its rear corner occupied by a triangular lip 63 that supports the rear margin of bottom wall 19' at the same horizontal level as the front margin thereof and sets up a case steadying frictional cling that tends to maintain the sides walls 13' at any chosen angular degree of opening.

The appended claims are directed to and intended to cover not only embodiments of the invention like those herein disclosed but also such alternatives to the parts and arrangements disclosed as come within a broad interpretation of the language of the claims and would be suggested by the disclosure hereof.

What is claimed is:

1. A functionally combined microscope and closable carrying case adapted to be opened to expose and condition the microscope for use, comprising a housing formed in part by spreadable walls, and a microscope having a supporting standard forming a fixed portion of said housing with respect to which said spreadable walls are movable in a manner either to enclose said microscope or to expose and help support said microscope in position for use, said fixed portion of said housing including a handle-like member between said spreadable walls and constituting a portion of said fixed portion of said housing, said microscope including a viewing tube, said handle-like member including a slide bearing through which said tube can be shifted from an outboard position to an inboard postiion with respect to said housing, and said viewing tube carrying an eyepiece in outboard relation to said slide bearing with respect to said carrying case, and said spreadable walls having hollow mating formations positioned to overlap and protectingly nest said eyepiece when said case is closed.

2. A functionally combined microscope and closable carrying case adapted to be opened to expose and condition the microscope for use, comprising a housing constituted by a one-piece molded body of resilient plastic material and formed in part by spreadable walls, a microscope having a supporting standard forming a fixed portion of said housing with respect to which said spreadable walls are movable in a manner either to enclose said microscope or to expose and help support said microscope in position for use, said housing including a rear wall, and a bottom end wall extending forward from the bottom of said rear wall, an underlapping bottom end wall projecting from the bottom of each of said spreadable walls, and frictional means operative between said bottom end wall and each of said underlapping end walls to oppose swinging of each of the latter relative to the former.

3. A functionally combined microscope and closable carrying case adapted to be opened to expose and condition the microscope for use, comprising a housing formed in part by spreadable walls, and a microscope having a supporting standard intermediate said walls and forming a projecting fixed portion of said housing with respect to which said spreadable walls are movably attached in a manner either to enclose said microscope or to expose and help support said microscope in position for use, said supporting standard including an elongated body external of the case and opposite said protecting portion shaped to be graspable and serve as a handle for carrying and maneuvering said case.

4. A functionally combined microscope and carrying case as defined in claim 3, in which said microscope includes a viewing tube, and said elongate body external of said case being a handle-like member constituting a portion of said fixed portion of said housing, said handle-like member including a slide bearing through which said tube can be shifted from an outboard position to an inboard position with respect to said housing.

5. A functionally combined microscope and carrying case as defined in claim 4, and retentive means in the interior surface of said spreadable walls receptive to accessory implements lodged therein, said retentive means comprising forwardly projecting resilient fingers of the same plastic material as that of said walls and said casing and molded integrally therewith.

6. A functionally combined microscope and carrying case as defined in claim 3, in which the said spreadable walls are hinged to the said supporting standard of the said microscope.

7. A functionally combined microscope and carrying case as defined in claim 3, in which the said solid body contains an elongate aperture of shape and size to admit the fingers of a clenched hand.

8. A functionally combined microscope and carrying case as defined in claim 3, in which the said supporting standard comprises a rear wall of the case having a socket at its top edge, and the said microscope comprises a viewing tube and a slide bearing adapted adjustably to support the same lodged removably in said socket.

9. A functionally combined microscope and carrying case as defined in claim 8, in which the said socket comprises a cutout in the said rear wall of the case having the said slide bearing removably seated therein.

10. A functionally combined microscope and carrying case as defined in claim 8, in which the said rear wall of the case is thickened by a pad-like boss containing the said cutout and also containing screw receptive holes, and the said handle-like member contains screw holes registering respectively with said screw receptive holes in said boss.

11. A functionally combined microscope and carrying case as defined in claim 3, in which the said housing including the said spreadable walls is constituted by a one-piece molded body of resilient plastic material.

References Cited

UNITED STATES PATENTS

| | | | |
|---|---|---|---|
| 2,551,780 | 5/1951 | Wood | 206—16 |
| 2,718,447 | 9/1955 | Wright | 206—16 |
| 3,019,486 | 2/1962 | Stinson | 351—153 |
| 3,186,574 | 6/1965 | Davidson | 220—31 |
| 3,307,896 | 3/1967 | Hoogèsteger | 350—86 |
| 3,324,997 | 6/1967 | Bonanno | 220—31 |
| 2,040,066 | 5/1936 | Ursinus | 350—86 X |
| 2,184,750 | 12/1939 | Meinhard et al. | 350—86 X |
| 2,214,367 | 9/1940 | Gallasch | 350—86 X |

FOREIGN PATENTS 819,900   4/1956   England.

DAVID SCHONBERG, *Primary Examiner.*

P. R. GILLIAM, *Assistant Examiner.*

U.S. Cl. X.R.

206—1, 16; 220—31, 94